Patented Oct. 1, 1935

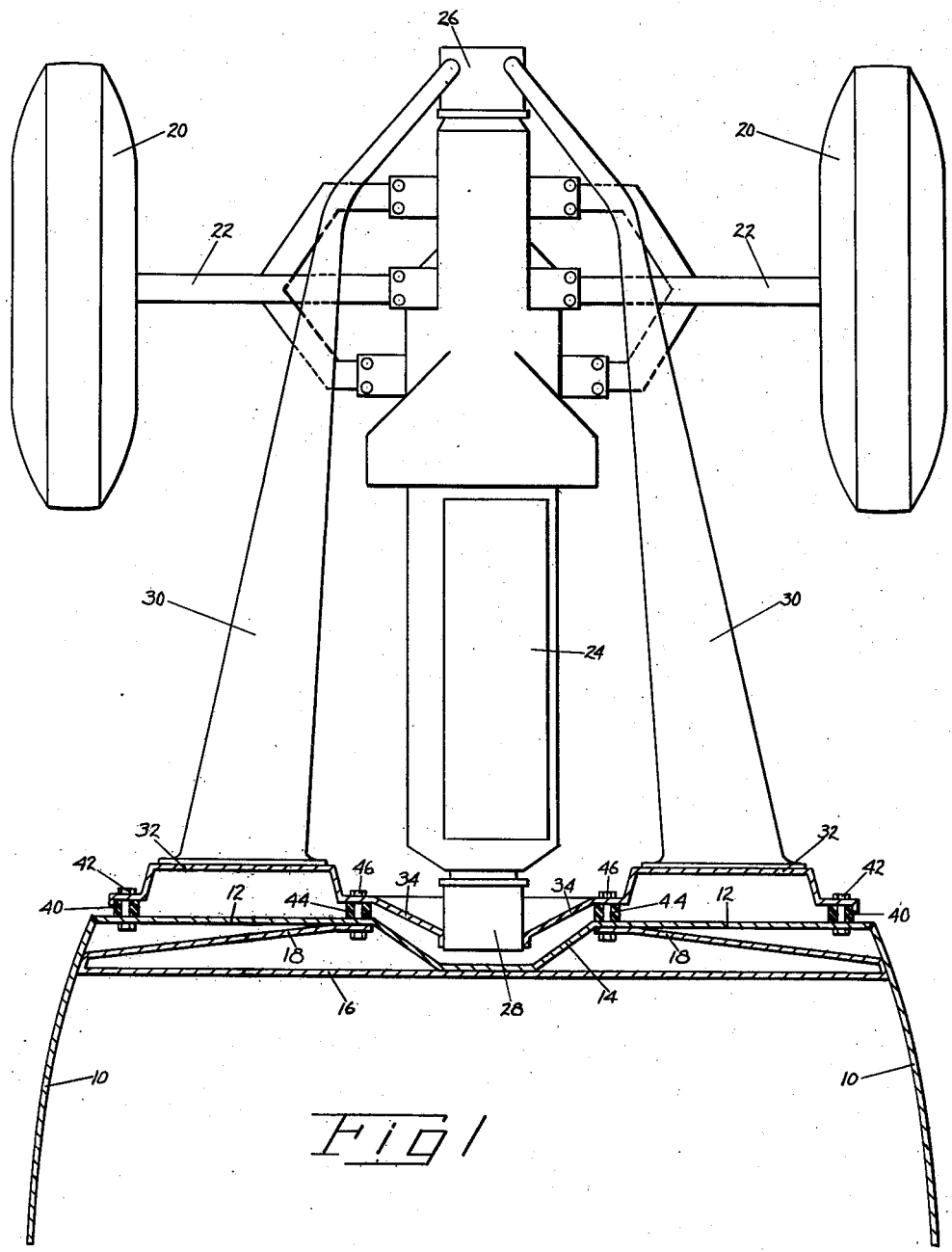

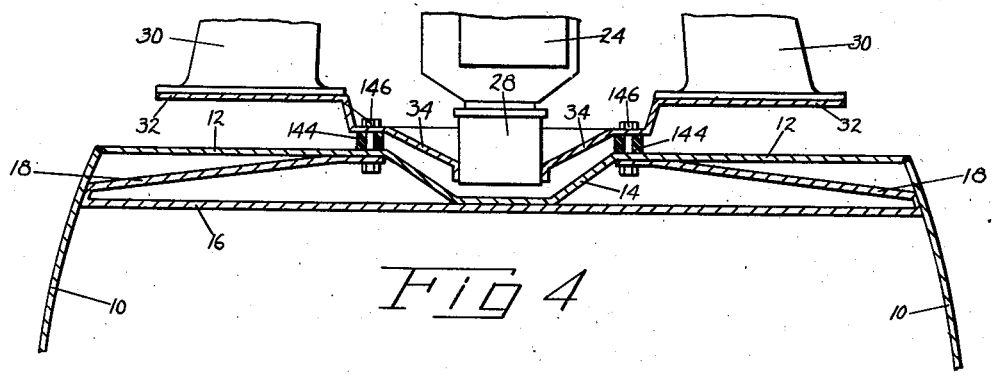
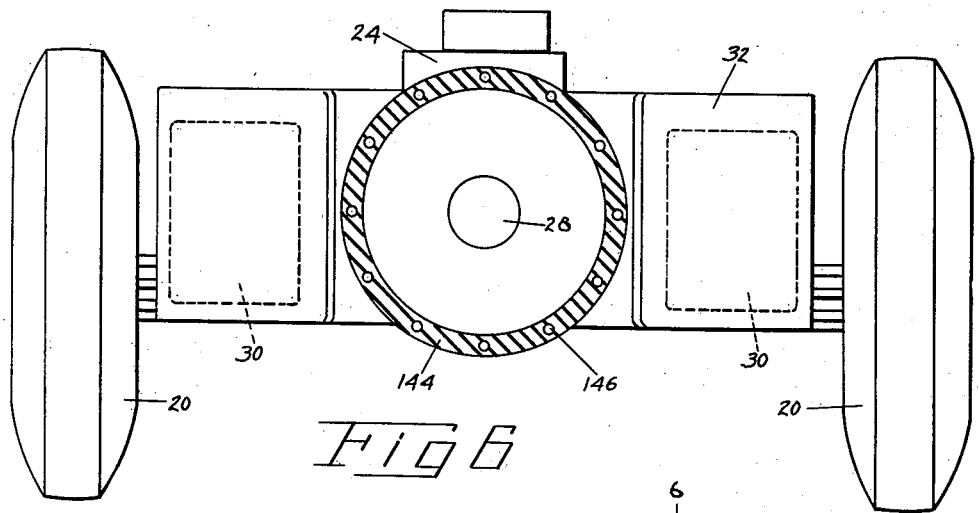
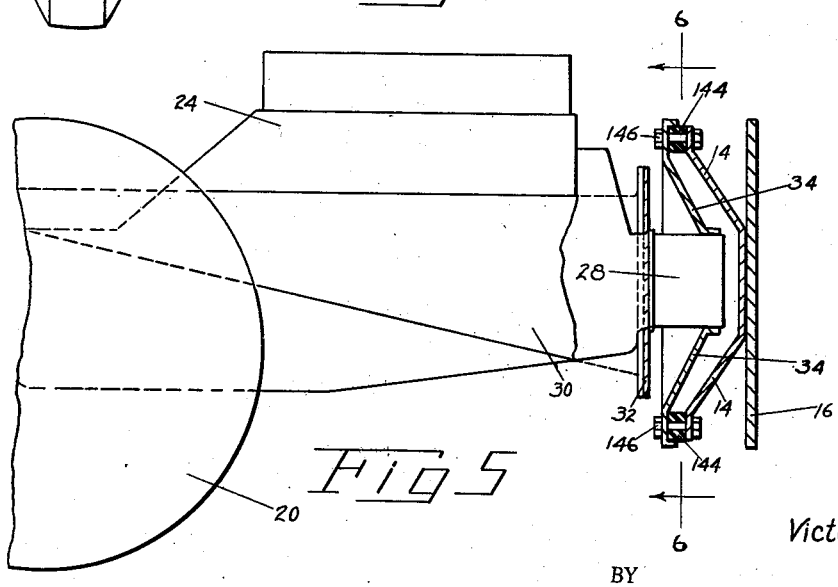

2,015,682

UNITED STATES PATENT OFFICE 2,015,682

VEHICLE

Victor W. Kliesrath, South Bend, Ind., assignor to The Steel Wheel Corporation, Chicago, Ill., a corporation of New York Application November 20, 1933, Serial No. 698,811

19 Claims. (Cl. 180—64)

This invention relates to vehicles, and is illustrated as embodied in an automobile having means for supporting the power plant on a transverse element of the chassis such as a part of the dash. An object of the invention is to provide a support for the power plant which will absorb vibration and noise without transmitting it into the body of the vehicle.

In one desirable arrangement the rear end of the power plant is supported by a transverse member, which is connected to the dash or an equivalent part by means which includes non-metallic material (such as a novel rubber element described below) through which the supporting member engages the dash or the like. Preferably the vehicle is generally in two sections, with the dash or its equivalent at the front end of the rear section, and with the front section, by means of which the power plant is supported on the front wheels, having at its rear end the above-described transverse member which supports the power plant. Thus the connection between the two vehicle sections comprises non-metallic material through which the sections engage each other, and which absorbs all noise and vibration of the engine.

In the arrangement shown in the drawings, the power plant is yieldingly and movably supported at its rear end directly on the above-described yieldingly-mounted transverse member, which preferably has a special novel structure for that purpose. I prefer that the front end of the power plant be supported (yieldingly and movably in the arrangement illustrated) by spaced arms or other supports carried by opposite sides of the above-described yieldingly mounted transverse member.

Where it is desired to have a considerable yield in the power plant mounting relatively to the rear vehicle section, the non-metallic material may be arranged in an annular zone or ring surrounding the rear mounting of the power plant. Where it is desired to have a substantially rigid connection between the two vehicle sections, while still absorbing and eliminating from the vehicle body all engine noise and vibration, this material may be additionally arranged in vertical zones or the like along the opposite sides of the dash or other supporting element. In the latter case, however, I prefer to make both the side zones and the annular central zone in one integral member, which may for example be molded of rubber.

The above and other objects and features of the invention, including various novel combinations of parts and desirable particular constructions, will be apparent from the following description of the illustrative embodiments shown in the accompanying drawings, in which:

Figure 1 is a top plan view of the forward portion of the vehicle, with the dash and the transverse member yieldingly mounted thereon shown in horizontal section approximately at the level of the rear engine support;

Figure 3:
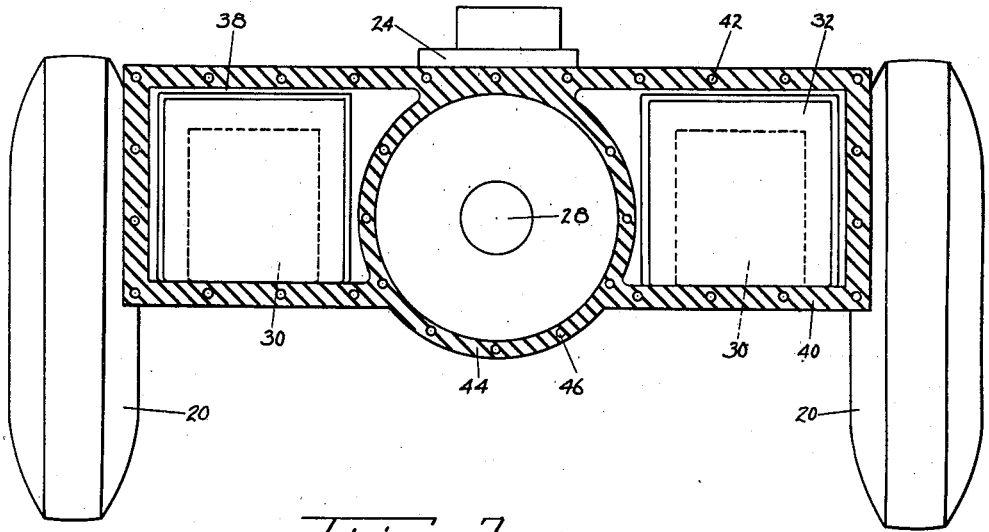
Figure 2:
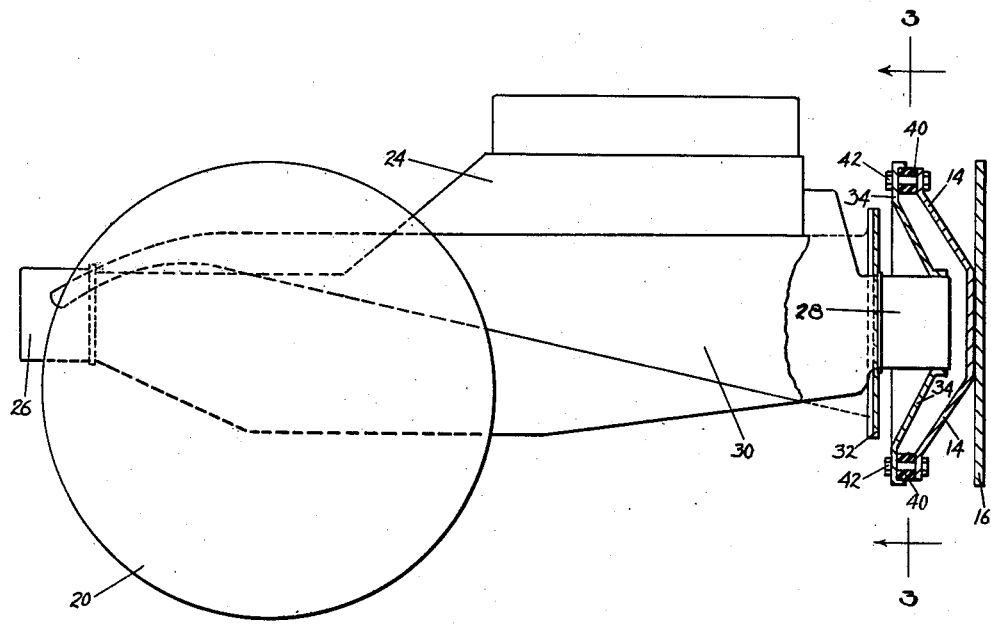
Figure 2 is a side elevation of the parts shown in Figure 1, but broken away to show the dash and the yieldingly-mounted member in central vertical section.

Figure 3 is a section on the line 3—3 of Figure 2, showing the arrangement of the non-metallic material; and Figures 4, 5, and 6 are views corresponding respectively to Figures 1, 2, and 3, but showing a modification.

The illustrated automobile comprises a rear section including a chassis element 10 (such as a box-section base forming part of the body) supported on the rear road wheels (not shown), and which has at its end a generally vertical dash or equivalent element extending transversely entirely across the vehicle.

The particular dash illustrated includes a vertical plate or stamping 12, welded or otherwise secured to the body 10 at the opposite sides of the vehicle, and having a conical central portion 14 to clear the engine support described below. This dash may be reinforced by means such as a secondary transverse plate 16, which may be welded to the body 10 at the sides of the vehicle, and which as shown has end portions or wings 18 doubled back and secured to the dash proper 12 by the bolts described below which are arranged in a circle about the base of the conical portion 14. This gives the dash the form of a very strong and rigid reinforced truss.

The front section of the vehicle is supported on steerable road wheels 20 swivelled at the outer ends of axle sections 22 which at their inner ends are yieldingly connected, by being mounted in rubber or the like in suitable sockets, to a power plant 24 shown as including in one unit an engine, a clutch ahead of the engine, and a transmission and differential ahead of the clutch. The power plant 24 drives the wheels 20.

The engine or power plant unit 24 has at its front and rear ends, coaxially of the axis of the crankshaft, cylindrical bosses sleeved within and vulcanized or otherwise bonded to yielding rubber bushings which in turn are sleeved within and externally bonded to supports or bearings 26 and 28. This gives a yielding movable mounting for the power plant 24, and permits the reaction vibrations of the power plant to be transmitted directly to the wheels 20 by the axle sections 22.

The front bearing 26 is welded or otherwise secured to the front ends of hollow-tapering stamped horizontal arms 30. These arms are spaced apart to straddle the power plant, and adjacent the opposite sides of the vehicle the bases of the arms are welded or otherwise secured to a generally-vertical transverse carrying element such as a stamped plate 32. The arms 30, being hollow, may be used as the fuel tank if desired.

The carrier or plate 32 is formed at its center with a conical portion 34, having a central cylindrical flange sleeved on and preferably welded to the rear engine support 28.

The parts described above (except plate 34) and their arrangement are more fully described, and various features of them are claimed, in my prior applications No. 651,821, filed January 14, 1933, No. 677,610, filed June 26, 1933, and No. 679,473, filed July 8, 1933, to which reference is made for further description. It it not my intention to claim in the present application any of the subject-matter of said prior applications.

According to an important feature of the present invention, the front and rear vehicle sections are connected by a sound and vibration absorbing, and preferably non-metallic, joint which is shown as connecting the transverse members 32 and 12.

In the arrangement of Figures 1, 2, and 3, used where such a joint is desired while at the same time a strong and rigid connection is secured between the sections, there is a member 38, of rubber or other non-metallic material, between these transverse members. The element 38 has side zones or bands 40 at the opposite sides of the vehicle, and adjacent these zones the members 12 and 32 are shown connected by fastenings such as bolts 42. The element 38 further has a central zone or ring 44 arranged between the bases of, and surrounding, the conical portions 14 and 34 of the transverse elements. The two elements may here also be connected, adjacent the zone 44, by fastenings such as a circle of bolts 46. The ring 44 is substantially equal to the height of member 38, which is much wider than it is high.

In the arrangement of Figures 4, 5, and 6, used when it is desired to permit slight relative movements of the vehicle sections, the connection is by means of an annular non-metallic member 144, preferably of rubber, the transverse elements being secured together by a circle of bolts 146 adjacent thereto.

While I prefer to make elements 38 and 144, or their equivalents, of rubber or a rubber compound, many of the advantages of the invention can be secured with cheaper materials such as heavy paper or felt impregnated with asphalt or the like.

While two illustrative embodiments have been described in detail, it is not my intention to limit the scope of the invention to those particular embodiments, or otherwise than by the terms of the appended claims.

I claim:

1. A vehicle having a rear section having a transverse member at its forward end, a front section provided with the front vehicle wheels and with the vehicle power plant and having at its rear end a transverse member forming part of the vehicle power plant support, non-metallic material arranged between the two transverse members, and means connecting the two transverse members and compressing the non-metallic material between them.

2. A vehicle having a rear section having a transverse member at its forward end, a front section comprising a power plant and having at its rear end a transverse member providing an engine mounting means, a non-metallic member arranged between the two transverse members and comprising upper and lower horizontal portions extending across the vehicle and portions extending vertically and joining the upper and lower portions, and means connecting the two transverse members and compressing the non-metallic material between them.

3. A vehicle having two sections provided with adjacent transverse members, a power plant carried by one of said sections and having one end supported by the transverse member of said section, non-metallic material between said members arranged annularly about the end of the power plant so supported, and means for securing said members together and compressing said material between them.

4. A vehicle having two sections provided with adjacent transverse members, a power plant carried by one of said sections and having one end supported by the transverse member of said section in the longitudinal center line of the vehicle, non-metallic material between said members arranged annularly about the end of the power plant so supported and also between said members at the extreme opposite sides of the vehicle, and means for securing said members together and compressing said material between them.

5. A vehicle having a chassis including a movably mounted power plant, said chassis comprising a rear section having a rigidly mounted transverse member, and a front section having a second transverse member movably supporting one part of the power plant, and means resiliently connecting said members, said transverse members being substantially vertical plates secured together with said means clamped between them.

6. A vehicle having a chassis including a movably mounted power plant, said chassis comprising a rear section having a rigidly mounted transverse member, and a front section having a second transverse member movably supporting one part of the power plant, and means resiliently connecting said members and including yielding non-metallic material compressed between said members, said transverse members being substantially vertical plates secured together with said means clamped between them.

7. A vehicle having a chassis including a movably mounted power plant, and having a rigidly mounted transverse member arranged generally in a vertical plane, said member constituting the vehicle dash, a second transverse member arranged generally in a vertical plane and movably supporting one part of the power plant, and a non-metallic member arranged vertically and clamped between and resiliently connecting said members.

8. A vehicle having a chassis including a movably mounted power plant, and having a rigidly mounted transverse member arranged generally in a vertical plane, said member constituting the vehicle dash, a second transverse member arranged generally in a vertical plane and movably supporting one part of the power plant, and means resiliently connecting said members, and including a flat vertical member of yielding non-metallic material compressed between said members.

9. A vehicle having a chassis including a movably mounted power plant, and having a rigidly mounted transverse member constituting the vehicle dash, a second transverse member movably supporting one part of the power plant, and means resiliently connecting said members and including non-metallic material arranged annularly about said part of the power plant and fastenings drawing said members toward each other longitudinally of the vehicle and compressing said material between them.

10. A vehicle having a chassis including a movably mounted power plant, and having a rigidly mounted transverse member arranged generally in a vertical plane, a second transverse member arranged generally in a vertical plane and movably supporting one part of the power plant, and means resiliently connecting said members and including a ring of non-metallic material arranged generally in a vertical plane annularly about said part of the power plant, and an annular series of fastenings drawing said members together longitudinally of the vehicle and compressing said material between them.

11. A vehicle having a chassis including a movably mounted power plant, and having a rigidly mounted transverse member, a second transverse member movably supporting one part of the power plant, and means resiliently connecting said members and including non-metallic material arranged annularly about said part of the power plant and also arranged between the opposite sides of said members adjacent their edges and compressed between said members.

12. A vehicle having a chassis including a movably mounted power plant, and having a rigidly mounted transverse member, a second transverse member movably supporting one part of the power plant, and means resiliently connecting said members and including non-metallic material arranged annularly about said part of the power plant and also arranged in vertical bands between the opposite sides of said members adjacent their edges and compressed between said members.

13. A vehicle chassis divided into two sections, a non-metallic member adapted to be arranged between said sections and comprising a generally-rectangular peripheral band of substantially greater width than height, the width being approximately that of an automobile body, and a central annular band substantially equal in diameter to the height of the peripheral band and integral therewith.

14. A vehicle having a dash, a transverse member extending entirely across the vehicle and reinforcing and connected to said dash and having the rear end of the vehicle power plant movably mounted thereon, and non-metallic means through which said member engages the dash.

15. A vehicle having a dash, a transverse member extending entirely across the vehicle and reinforcing and connected to said dash and supporting the rear end of the vehicle power plant, and non-metallic means through which said member engages the dash.

16. A vehicle having arms supporting the front end of a power plant, and chassis means adjacent the rear end of said plant supporting the rear end of the power plant and yieldingly supporting the rear ends of said arms.

17. A vehicle having arms supporting the front end of a power plant, and a chassis having a transverse member yieldingly supported thereby and supporting said arms and yieldingly supporting the rear end of the power plant.

18. A vehicle having a dash, a transverse member carried by said dash and having non-metallic means through which it engages said dash, and a power plant support comprising spaced forwardly-projecting members carried by said member adjacent the opposite sides of the vehicle.

19. A vehicle having a dash, a transverse member carried by said dash and having non-metallic means through which it engages said dash, and a power plant support comprising spaced forwardly-projecting members carried by said member adjacent the opposite sides of the vehicle, said spaced members and said transverse member having supports respectively for the front and rear ends of a power plant.

VICTOR W. KLIESRATH.